March 23, 1926.
M. M. RAFKIN
ARTIFICIAL TOOTH AND KEY
Filed Dec. 9, 1924
1,577,753
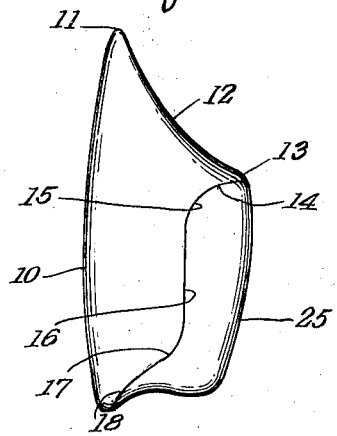
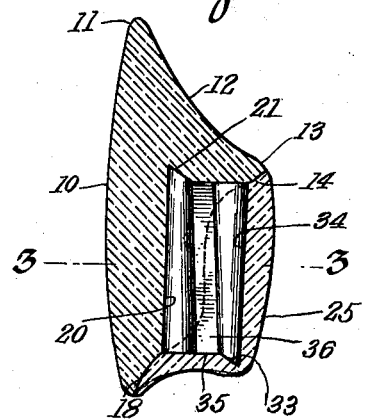
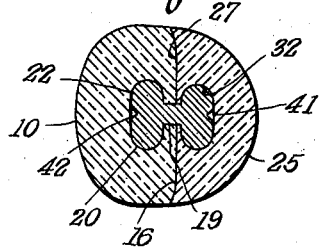
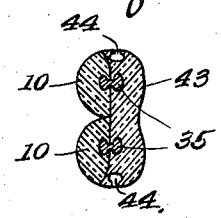
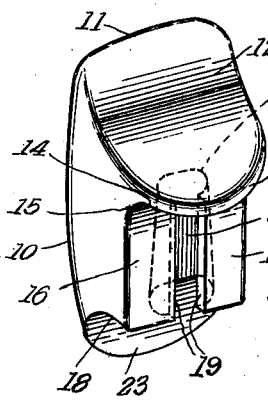
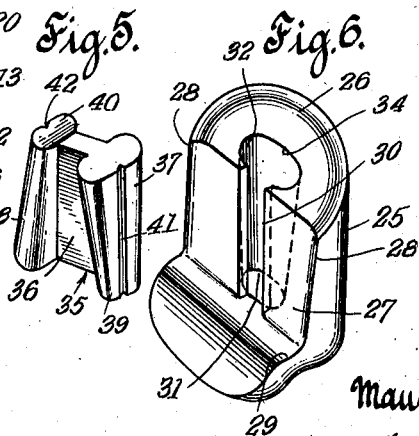
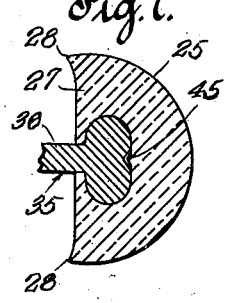
INVENTOR
Maurice M. Rafkin
BY
Charles L. Wright
ATTORNEY Patented Mar. 23, 1926.

1,577,753

UNITED STATES PATENT OFFICE.

MAURICE M. RAFKIN, OF NEW YORK, N. Y.

ARTIFICIAL TOOTH AND KEY.

Application filed December 9, 1924. Serial No. 754,728.

*To all whom it may concern:*

Be it known that I, MAURICE M. RAFKIN, a citizen of the United States, and a resident of New York, in the county of New York and State of New York, have invented new and useful Improvements in Artificial Teeth and Keys, of which the following is a specification.

This invention relates to artificial teeth and the keys or connecting members whereby the teeth may be firmly secured to a support, such as a dental plate, portion of bridgework or other dental structure.

One of the objects of the invention is to provide an artificial tooth of unusual strength, rigid construction and pleasing appearance, the tooth being so designed as to permit grinding any of its surfaces to suit conditions, without materially weakening the structure, and which presents solid interengaging abutments resistant of malformation under stress, as during mastication.

It is a further feature to produce a tooth facing so shaped as to have the appearance of a natural tooth and which completely obscures the support to which it may be engaged.

Another aim is in the provision of a novel key or securing member that is at once reversible, interchangeable and capable of positive fixation, becoming a component part of the tooth structure, uniting the parts in a secure manner and without danger of fracturing the same.

These and other analogous aims and objects, such as will be readily understood by those familiar with the art, and which include a material lessening of labor in moulding, fitting, fastening in place, substitution of damaged facings, and economy in manufacturing, are accomplished by the novel design, construction and combination of parts hereinafter described and shown in the accompanying drawing, constituting a material part of this disclosure, and in which:—

Figure 1 is a side elevational view of a conventional type of lower front tooth made in accordance with the invention.

Figure 2 is a longitudinal sectional view taken in a vertical plane through the approximate center thereof.

Figure 3 is a transverse sectional view taken in a plane represented by the line 3—3 of Fig. 2.

Figure 4 is a perspective view of the buccal facing of a slightly modified tooth in detail, looking from the inner side.

Figure 5 is a perspective view of the key or dowel used as a connecting member between the facing and backing or support of the tooth.

Figure 6 is a perspective view of backing or pontic element of a single tooth as shown in Fig. 4, looking from the inner or adjacent side.

Figure 7 is a fragmentary transverse sectional view of the support with the key in place.

Figure 8 is a transverse sectional view of two facings as secured to a single backing or plate member and also illustrating means for making lateral attachments.

In the drawing, the numeral 10 designates in general the labial or buccal facing of an artificial tooth, preferably made of porcelain, of such size, shape and shade of color as to present the appearance of a natural tooth to an observer, although gold, platinum or other material, not subject to decay or affected by foods, saliva and the like may be used.

From the biting or incisal edge 11 the cervical portion 12 curves convexly to an overhanging member 13 presenting at its under side 14 an abutting surface disposed transversely across the inner side of the tooth at substantially a right angle to its face, this surface blending by a fillet 15 into a flat plane surface 16 approximately parallel with the general exterior surface of the tooth and thence curved outwardly, as at 17, into the base or abutment 18.

Formed in the flat inner side 16, centrally thereof and extending longitudinally from the abutment 18 to the curve 15, is a slot 19 of parallel width, communicating with an undercut recess 20 having curved side walls tapered convergingly from the abutment 18 towards the fillet 15 which they intersect, as at 21, the bottom of the recess being also curved to a relative large radius, as at 22. As shown in Fig. 4, the tooth facing may have a projecting lip 23, which completely obscures the support 25 to which it may be attached.

This support or backing, shown in detail in Fig. 6, is made preferably of metal or rubber, complementary to the facing in all respects, its side walls however being slightly narrowed so as to be entirely covered from view by the facing, this element being made by waxing up the facing in the usual manner.

One end 26 of the support is shaped to fit the element 14 and 15 of the facing and its inner face 27 is provided with minute ledges 28 adapted to overlie the slightly curved, corresponding edges of the facing making a tight joint therewith.

The opposite end of the support is flanged outwardly at substantially a right angle, as at 29, to exactly fit the abutment 18 which eventually becomes seated thereon, while abutting surface 14 rests correspondingly on the part 26.

Formed longitudinally in the center of the surface 27 is a parellel walled slot 30 corresponding in width with the slot 11, and like it is open to a recess 31 having curved side walls 32 tapered convergingly from its open end in the backing surface 26 to its narrower end on the opposite or base end of the support where it is angularly inset as at 33, see Fig. 2.

The rear wall 34 of the recess is curved to a relatively large radius and it is to be understood that the slots and recesses in the facing and support are exactly alike except being arranged in opposed relation.

A connecting member 35, variously termed a key, dowel, link or pin, preferably made of gold or platinum by die forming or casting, presents a flat parallel bar or plate portion, suited to engage in the slots 19, and 30 and being of equivalent length.

On the longitudinal edge of the bar are wedge shaped flange members 37 and 39 arranged in reversed relation and having angular projections 39 and 40 coincident with the corresponding depressions 21 and 33. It will be understood that this key can be baked into the porcelain in the course of its manufacture.

In order to permit escape of any surplus of cement, if used in securing the key flanges in the recesses, the outer, slightly convex surfaces of the flanges are provided with longitudinal V shaped slots 41 and 42 whereby an excess of the cement will flow when the tooth parts are finally fitted in permanent position, and which act to prevent the metallic key from showing through the porcelain, a thin filament of the cement covering the flange surfaces of the key.

In Fig. 8, two facings 10 are shown as supported by a bridge 43 integrally formed and provided with recesses receptive of appropriate keys by which the structure can be firmly connected to suitable anchorages. The novelty in Fig. 7 is in the provision of a rib 45, which can be formed in the backing to fill the slot in the key.

From the foregoing, it will be seen that their effect is to draw the facing and support together and maintain them in proper relation.

While the support 25 is shown as applied to a single tooth facing, it is obvious that a plurality of such backings may be cast or molded integrally as part of an articficial denture, either full or partial, by methods well known to the profession, as by entering the keys into the facings, arranging the facings in proper position and waxing their inner surfaces, including the keys, whereby an exact pattern may be prepared for a subsequent casting in metal or vulcanizing in rubber, this being indicated in Fig. 8.

Attention is also called to the fact that should a facing become chipped or otherwise damaged, the same may be readily removed and another substituted without disturbing the backing.

It may be further remarked that the ease with which the facing can be removed and accurately replaced during the preliminary work of fitting, permits grinding and shaping of any part of the tooth unusually convenient.

In either fixed or removable bridge work, devices including the wedge-shaped recesses in the abutment or anchorage teeth, and the reversible key members may be used to excellent advantage, as will be readily understood.

As changes of construction could be made within the scope of the invention, it is intended that all matter contained in the foregoing description or shown in the accompanying drawings, shall be interpreted as illustrative and not in a limiting sense.

Having thus described my invention, what I claim as new and desire to secure by Letters Patent, is:—

1. An artificial tooth comprising a labial facing and a support therefor having flat juxtaposed median surfaces, said surfaces containing longitudinal recesses having parallel sides and communicating with undercut recesses of wedge shaped formation, the undercut recess in said facing being wider at its open cervical end and the corresponding undercut recess in said support being tapered reversely thereto, said undercut recesses having concavely curved bottoms, a reversible key having flanged edges fitting the recesses indiscriminately to extend level with the cervical end of the tooth, and a groove formed in the convex portions of said key to extend centrally throughout the length thereof.

2. In an artificial tooth, a facing, a reversible key consisting of a plate of uniform thickness having right angled flanges on both longitudinal edges, one of said flanges having its edges tapered to form a wedge and the other flange similarly tapered oppositely to the first flange to form an opposed wedge, the outer surfaces of both flanges being convexly curved, said facing having recesses shaped in conformity with the wedge and plate of said key and angular projections on the smaller ends of said wedge shaped elements.

3. In an artificial tooth having a facing and backing, a reversible key consisting of a plate of uniform thickness having right angled flanges on both longitudinal edges, one of said flanges having its edges tapered to form a wedge and the other flange similarly tapered oppositely to the first flange to form an opposed wedge, the outer surfaces of both flanges being convexly curved, a groove in the center of each flange extending the full length thereof, said facing and backing respectively being recessed to collectively receive said key and projections on the smaller ends of each flange, said projections having bevelled points to enter corresponding depressions in said facing and backing.

4. A reversible key for artificial teeth having a facing and a backing, said key comprising an oblong rectangular metal plate of uniform thickness having flanges at both longitudinal edges extending equally outward from both sides, said flanges having tapered and rounded edges of semi-conical cross section to produce opposed wedge shaped profiles of uniform contour, the flanges on one edge of said plate being tapered reversely to the flanges on the opposite edge.

In testimony whereof, I have signed my name to this specification.

MAURICE M. RAFKIN.